US 11,165,116 B2

(12) United States Patent
Ribbentrop et al.

(10) Patent No.: US 11,165,116 B2
(45) Date of Patent: Nov. 2, 2021

(54) BATTERY FOR AN INDUSTRIAL TRUCK

(71) Applicant: Jungheinrich Aktiengesellschaft, Hamburg (DE)

(72) Inventors: Klaus-Peter Ribbentrop, Henstedt-Ulzburg (DE); Tilman Rosenberg, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 23 days.

(21) Appl. No.: 16/255,944

(22) Filed: Jan. 24, 2019

(65) Prior Publication Data

US 2019/0229314 A1 Jul. 25, 2019

(30) Foreign Application Priority Data

Jan. 24, 2018 (DE) .................... 10 2018 101 530.5

(51) Int. Cl.
| | |
|---|---|
| *B60K 1/00* | (2006.01) |
| *H01M 50/20* | (2021.01) |
| *H01M 10/42* | (2006.01) |
| *B60K 1/04* | (2019.01) |
| *B66F 9/075* | (2006.01) |
| *H01M 10/0525* | (2010.01) |

(Continued)

(52) U.S. Cl.
CPC ............... *H01M 50/20* (2021.01); *B60K 1/04* (2013.01); *B60L 50/64* (2019.02); *B60L 50/66* (2019.02); *B66F 9/0759* (2013.01); *B66F 9/07531* (2013.01); *H01M 10/0525* (2013.01); *H01M 10/425* (2013.01); *B60K 2001/0405* (2013.01); *B60K 2001/0422* (2013.01); *B60L 2200/44* (2013.01); *B60P 1/00* (2013.01); *B60Y 2200/15* (2013.01); *H01M 2010/4271* (2013.01); *H01M 2220/20* (2013.01)

(58) Field of Classification Search
CPC .. B60K 1/00; B60K 1/04; B60L 50/64; B60L 50/66
See application file for complete search history.

(56) References Cited

U.S. PATENT DOCUMENTS

| | | | | |
|---|---|---|---|---|
| 1,875,627 | A * | 9/1932 | Mancha | ................... B61C 3/02 |
| | | | | 105/51 |
| 3,497,090 | A * | 2/1970 | Daniels | .................. B62D 37/04 |
| | | | | 414/347 |

(Continued)

FOREIGN PATENT DOCUMENTS

| | | |
|---|---|---|
| DE | 19846000 A1 | 5/1999 |
| DE | 102005060095 | 6/2007 |

(Continued)

OTHER PUBLICATIONS

DE 102018101530.5 filed Jan. 24, 2018, German Search Report dated Nov. 28, 2018, 8 pages.

(Continued)

*Primary Examiner* — Hau V Phan
(74) *Attorney, Agent, or Firm* — Barclay Damon LLP

(57) ABSTRACT

A battery for an industrial truck comprises a battery body that comprises a first base body and a second base body. The second base body is positioned adjacent to the first base body. The first base body and the second base body extend a same length in one dimension and the first base body has a greater height than the second base body.

18 Claims, 3 Drawing Sheets

(51) Int. Cl.
  *B60L 50/60* (2019.01)
  *B60L 50/64* (2019.01)
  *B60P 1/00* (2006.01)

(56) References Cited

U.S. PATENT DOCUMENTS

| | | | | |
|---|---|---|---|---|
| 4,026,378 | A * | 5/1977 | DePriester | B60K 1/04 180/68.5 |
| 5,437,939 | A * | 8/1995 | Beckley | B66F 9/07531 429/99 |
| 5,736,272 | A * | 4/1998 | Veenstra | H01M 2/1077 429/100 |
| 5,886,501 | A * | 3/1999 | Marks | H01M 2/1083 320/107 |
| 6,189,636 | B1 * | 2/2001 | Kikukawa | B60K 1/04 180/65.1 |
| 8,551,640 | B2 * | 10/2013 | Hedrich | H01M 2/1077 429/158 |
| 2009/0020368 | A1 * | 1/2009 | Bogelein | B60K 1/04 187/222 |
| 2015/0203339 | A1 * | 7/2015 | Sakai | B66F 9/07531 180/68.5 |
| 2015/0318725 | A1 * | 11/2015 | Brockman | H02J 7/0047 340/636.1 |
| 2015/0375977 | A1 * | 12/2015 | Nakazawa | B60K 1/00 187/222 |
| 2017/0136864 | A1 | 5/2017 | Ito et al. | |
| 2017/0288285 | A1 | 10/2017 | Buckhout et al. | |
| 2017/0288286 | A1 | 10/2017 | Buckhout et al. | |

FOREIGN PATENT DOCUMENTS

| | | |
|---|---|---|
| DE | 102008034861 A1 | 6/2009 |
| DE | 102013113809 A1 | 6/2015 |
| EP | 0936178 A1 | 8/1999 |
| JP | 2001063980 A | 3/2001 |
| JP | 2003238083 A | 8/2003 |
| JP | 2012201188 A | 10/2012 |
| JP | 2017076527 A | 4/2017 |
| SE | 309385 | 3/1969 |

OTHER PUBLICATIONS

EP 19151240.0 filed Jan. 10, 2019, European Search Report dated Jul. 8, 2019, 9 pages.
EP 19151240.9 filed Jan. 10, 2019, European Office Action dated Mar. 17, 2021 (17 pages).

* cited by examiner

BATTERY FOR AN INDUSTRIAL TRUCK

CROSS REFERENCE TO RELATED INVENTION

This application is based upon and claims priority to, under relevant sections of 35 U.S.C. § 119, German Patent Application No. 10 2018 101 530.5, filed Jan. 24, 2018, the entire contents of which are hereby incorporated by reference.

BACKGROUND

The present invention relates to a battery for an industrial truck having a standardized battery body. Batteries for industrial trucks are carried along in a drive portion of the industrial truck. As a general rule, a laterally accessible battery compartment is provided for this, into which the battery can be inserted and from which it can be removed. In this case, the battery has a cuboid shape which can be rounded at its edges and corners. The battery compartment for receiving the cuboid battery is frequently arranged on an external side of the drive portion and delimits, for example, a driver's workstation with respect to the load portion. The process of arranging batteries in the form of battery elements within the vehicle in a distributed manner is additionally known such as, for example in DE 198 46 000 A1, with multiple blocks of batteries being arranged in a distributed manner.

The object of the invention is to provide a battery for an industrial truck, which is particularly well adapted to the requirements in the drive portion of the industrial truck.

BRIEF SUMMARY OF THE INVENTION

In an embodiment, a battery for an industrial truck has a standardized battery body. In this case, a standardized battery body means that the battery as a whole is configured as one unit and can be handled in a standardized manner. The battery body is not restricted to being configured as one piece or having an integral sheathing. The shape of the battery body, as its outer dimensions, is formed from a first and at least one second base body. The base bodies are, in this case, not base bodies which are physically separated from one another or which are connected to one another, but imaginary base bodies which, in an overall view of their body dimensions, together produce the battery body as a whole. The base bodies each have a shape which is characterized by one height. The height refers to an extension in one dimension, wherein the direction of the extension is predefined by the planned installation position in the industrial truck. This means that, for example, when the battery is installed in a lying manner, the height of the battery can extend in the longitudinal direction of the vehicle or transversely thereto. The height can in particular describe the extension in the vertical direction, based on the installation position of the battery. The base bodies of the battery body differ in their height. The two base bodies next to one another produce two different heights for the battery body, these are regions with preferably parallel faces which are spaced from one another by a difference in height. The preferably parallel faces can in particular be arranged horizontally in the installation position. They can in particular be arranged on an upper side of the battery. Two bottom sides of the two base bodies opposite the two upper sides can likewise be arranged horizontally, in particular at the same height. One advantage of the different heights for the battery is that said battery can be integrated, in a space-saving manner, into the drive portion of the industrial truck. In this case, it is also provided that a seat for the driver is arranged above the higher base body and the lower base body provides the necessary legroom for the driver sitting on the seat. In this way, the different level of the base bodies can be easily exploited for the driver's workstation.

The base bodies are preferably provided with a cuboid shape, to which cuboid shape a depth, width and height are assigned. The cuboid shape can have one or more rounded edges. The depth of the battery body corresponds in each case to the depth of the base bodies.

The two imaginary base bodies are preferably combined to form the battery body in such a manner that the width of the battery body corresponds to the width of the two base bodies. The two base bodies are arranged relative to one another in such a manner that their respective width is added to form the total width of the battery body. The depth of the base bodies arranged next to one another and not behind one another is not added.

In an embodiment, battery terminals are arranged on one side pointing away from a contact area of the battery. The side pointing away forms the upper side of the battery. The battery terminals are consequently located at the top of the battery and can be contacted there. The contact area preferably has legs which are, for example, equipped with sliding blocks from a plastic material.

The battery itself consists of a plurality of battery cells, wherein these cells are preferably lithium-ion or lithium polymer cells. A battery management system is provided in the battery body in order to operate the battery cells. This can be arranged in the first base body having the greater height. Although the battery management system is arranged, for example in the first base body, it is responsible, in operation, for all of the battery cells, that is to say for the battery cells in both base bodies. It is also clear from this that the described base bodies neither physically subdivide the battery body, nor are the components provided in the battery body separated from one another by the base bodies. Rather, the base bodies merely distinguish exterior regions of the battery body having a differing height from one another.

In an embodiment, at least three lines each having multiple battery cells are arranged in the battery body. In this case, at least two lines are arranged above one another, which at least partially fills the first base body having the greater height. At least two lines of battery cells are additionally arranged next to one another. This arrangement then extends, for example, over the first and the second base bodies. Generally, depending on the operating voltage, preferably 4 or 8 battery cells form one stack and preferably 2 stacks form a line. The distinction of stacks and lines is not decisive for the construction of the battery.

In an embodiment, the battery management is arranged above a line having battery cells. The arrangement relatively high up in the battery makes access to the battery management system easier, for example in order to exchange this either wholly or partially, including in particular in the installed condition of the battery.

In an embodiment, the battery body has at least one protruding fastening tab. The battery body can be detachably mounted in the drive portion by means of the at least one fastening tab. In particular, in the case of lithium batteries, it is not necessary to remove the battery from the vehicle for a charging process.

The object according to the invention is likewise achieved by an industrial truck having a drive portion and a load portion, wherein the drive portion has a driver's cab with a driver's seat and the battery is arranged in the drive portion in such a manner that the driver's seat is arranged above the higher base body. The lower base body of the battery body preferably creates legroom for a driver sitting on the driver's seat. In terms of its width, the battery body preferably fills a driver's cab and the space provided in it.

BRIEF DESCRIPTION OF THE DRAWINGS

One preferred embodiment of the battery and of an industrial truck having said battery is described in greater detail below, wherein.

DETAILED DESCRIPTION OF THE INVENTION

Figure 1:
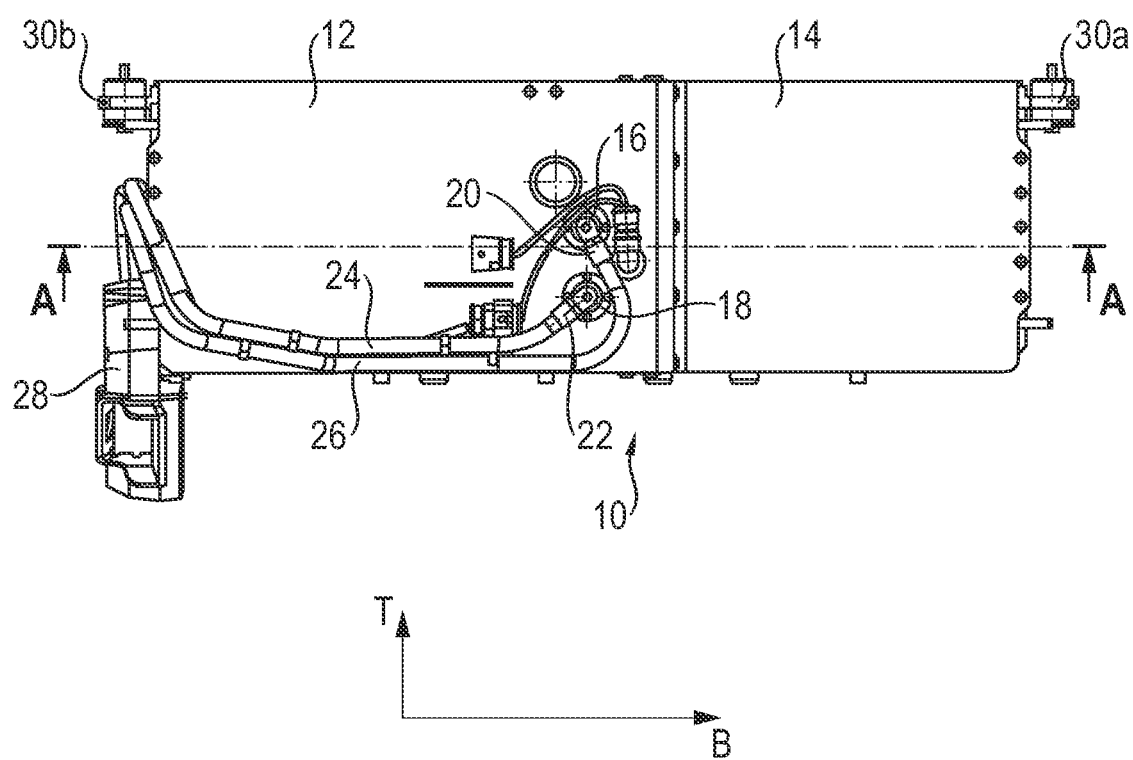
FIG. 1 illustrates a top plan view of an embodiment of a battery.

FIG. 1 shows a top view of a battery body 10 which has a first base body 12 and a second base body 14. The battery body 10 has a width along the marked direction B and a depth in direction T. FIG. 1 additionally shows that the base bodies 12 and 14 have the same depth and the width of each respective base body 12, 14 is added to form the total width of the battery body 10.

Two electrical battery terminals 16, 18 are represented on the upper side of the base body 12, which electrical battery terminals are each connected by means of a cable lug 20, 22 to an associated electrical cable 24, 26. The electrical cables 24, 26 are routed onto one side of the battery body 10 and are connected to an electrical connector 28 in an electrically conducting manner. The battery can be contacted by means of the electrical connector 28, for example for a charging process to an external connector (not represented). Further electrically conducting connections, which lead into the interior of the vehicle and supply the electrical consumers thereof, are not represented for the sake of clarity.

The battery body 10 has, widthwise, laterally protruding tabs 30a, 30b which allow it to be fastened in the industrial truck. The battery body 10 can, for example, be detachably fastened in the drive portion by means of the tabs 30a, 30b.

Figure 2:
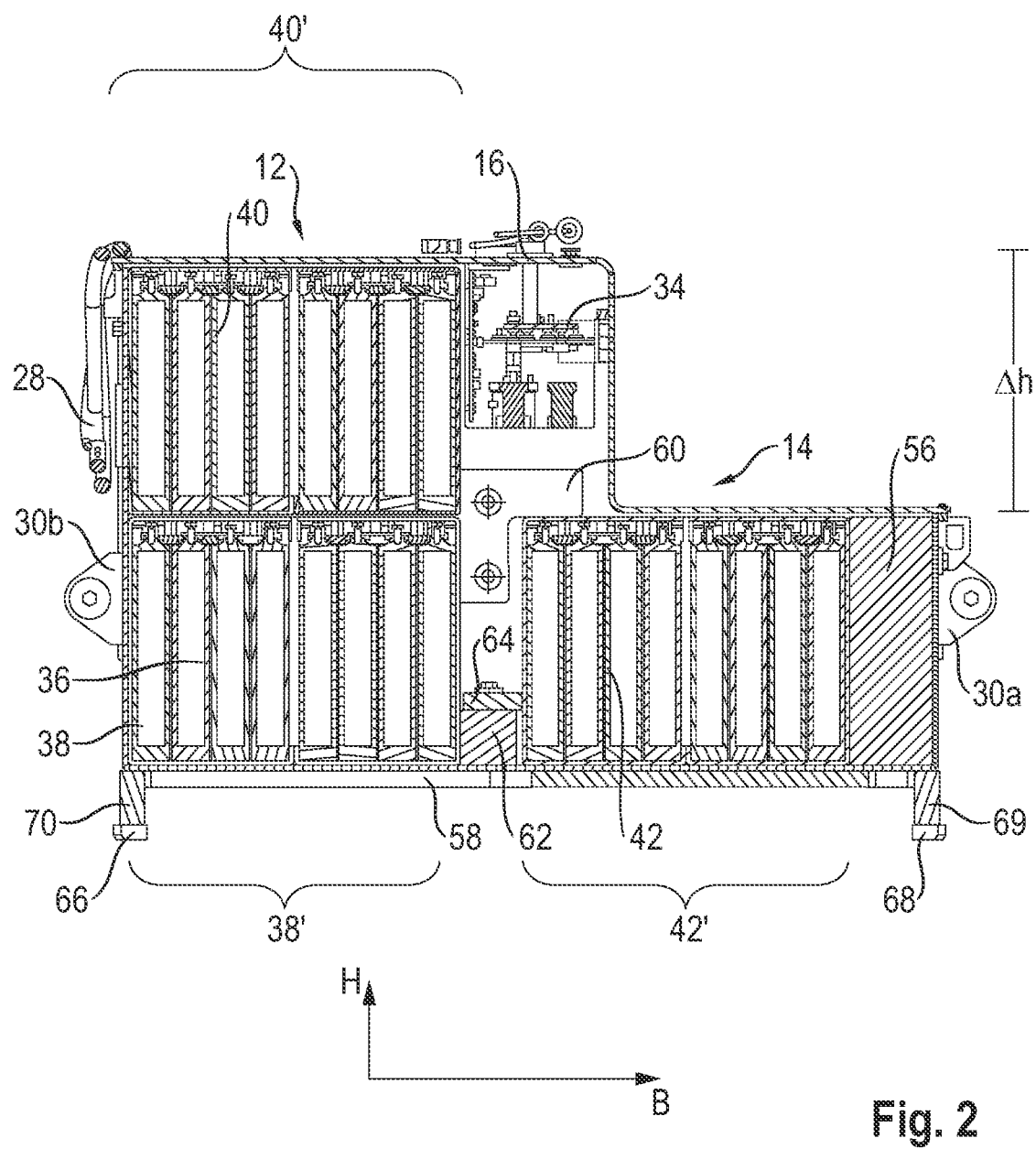
FIG. 2 illustrates a cross-sectional view of the battery of FIG. 1 along line A-A.

FIG. 2 shows the section along line A-A from FIG. 1. The base body 12, which has a height which is greater by A h compared to the base body 14, can be clearly seen. It can also be seen that the base body 12 has a greater width than the base body 14.

In the cross-sectional view from FIG. 2, the battery management system 34 can be seen below the battery terminal 16. The battery management system 34 is accommodated in the higher base body 12. This placement ensures that the battery management system 34 has good spatial contact with the battery terminals 16, 18.

The battery body 10 has a plurality of stacks 36, in which battery cells 38 are combined. In the sectional view, four battery cells per stack can be seen, wherein the same number can once again be arranged in the depth. In this case, the stacks 36 and 40 are arranged above one another, while the stacks 36 and 42 are arranged next to one another. It can also be clearly seen that the stack 42 is not restricted to the second base body 14, but also extends into the higher base body 12. In each case, two stacks are combined to form one line 38', 40', 42'. One line 38', 40', 42' forms a modular unit.

FIG. 2 additionally shows two weights 56 and 58, the object of which is, on the one hand, to increase the weight of the battery and, on the other hand, to position the center of gravity of the battery in the central axis, with respect to the width of the battery. Weight 56 is arranged laterally outside the base body and weight 58 has an L shape, wherein the shorter leg of the weight 58 is arranged in the region of the higher base body. The line 42 is fastened in the battery by means of a bracket 60. The line 42 is a compact modular unit so that this can be held by the bracket 60 and the weight 56. A weight strip 62 is arranged on the bottom of the battery and likewise serves to position the battery line 42 by means of a position profile 64.

Sliding blocks 66, 68 may be comprised of a plastic material and are configured to facilitate the assembly of the battery in the vehicle. The sliding blocks are preferably affixed to legs 69, 70, by means of which space for the L-shaped weight 58 is created on the bottom of the battery.

Figure 3:
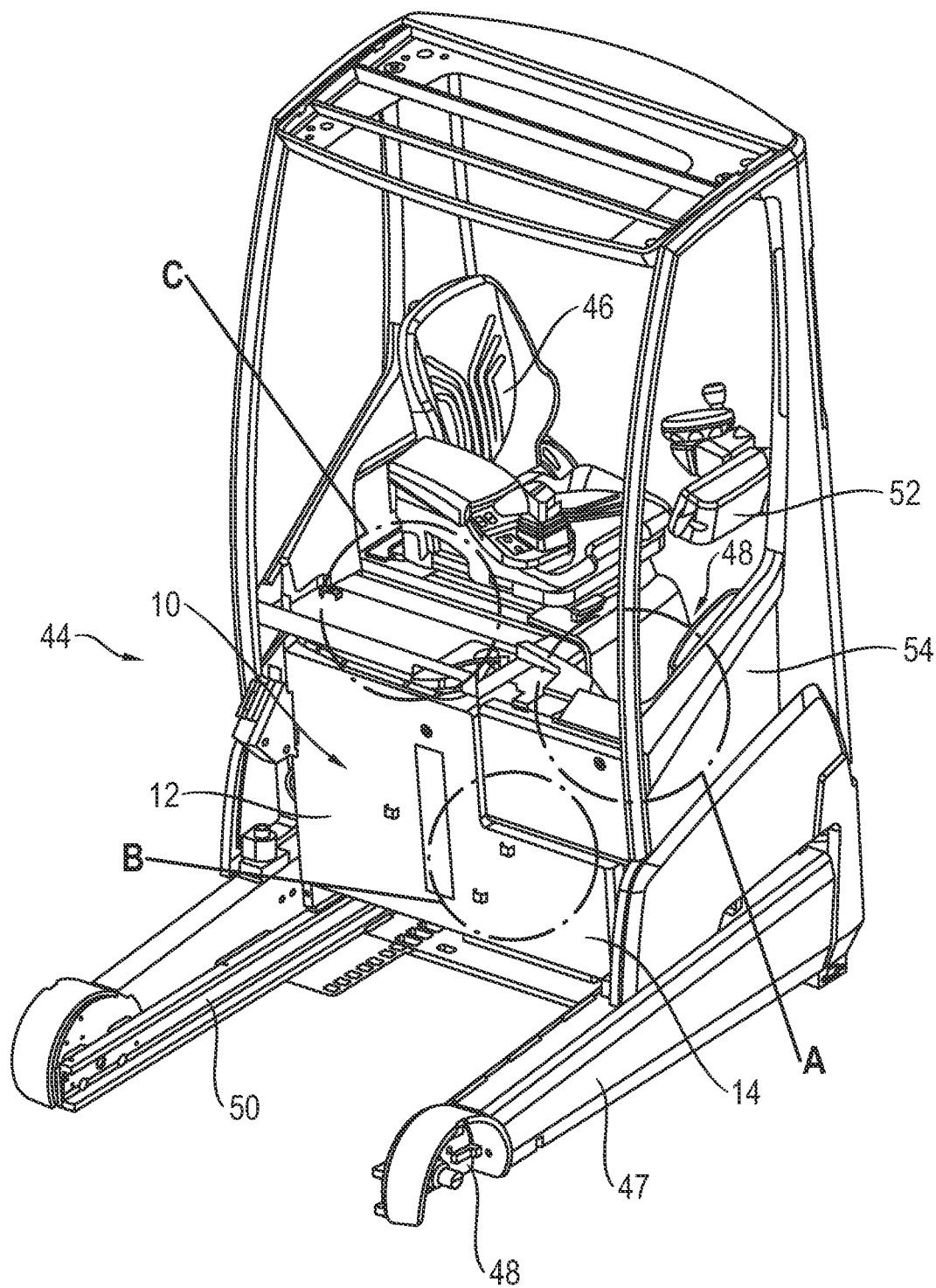
FIG. 3 illustrates a perspective view of the drive portion of an embodiment of a reach truck having an inserted battery.

FIG. 3 shows a drive portion 44, in which the load portion and some movable parts are not represented for the sake of clarity. The wheel arms 47, which each support a wheel well 48 at their end, can be seen. The wheel arms 47 each have a rail 50 in which a thrust mast can be moved. The battery body 10 can be seen adjacent to or respectively behind the thrust mast. The battery body 10 has a higher base body 12, the upper edge of which extends below the level of a seat fastening of the driver's seat 46. The lower base body 14 thereby extends into the footwell. A driver's seat 46 which has a footwell 48 can be seen in FIG. 3. A control element 52, which can be operated by a sitting driver, is arranged opposite the driver's seat 46 and above the footwell 48.

The battery having base bodies 12, 14 of differing heights provides a range of benefits which can be explained particularly well in regions A, B and C of FIG. 3. Region A shows that a relatively high sitting position of the driver's seat 46, together with deep-drawn side walls 54, provide the driver with a good overall view which also includes a view through the thrust mast of the fork of the load-carrying means.

The partially lower height of the battery, as represented in region B, makes a large footwell 48 possible and provides sufficient room for the legs and knees of the driver.

In region C, sufficient space is available on the higher of the two base bodies 12 in order to provide an ergonomically usable driver's seat 46, which preferably has a wide seat support and appropriate tilting and rotating functions. The stepped configuration of the battery exploits the space in the drive portion particularly well, since the driver's seat and space for the legroom define different height levels in the drive portion.

LIST OF REFERENCE NUMERALS

10 Battery body
12 Base body
14 Base body
16 Battery terminals
18 Battery terminals
20 Cable lug
22 Cable lug
24 Cable
26 Cable
28 Connector
30 a/b Protruding tab
32 Projecting tab
34 Battery management system
36 Stacks 38 Battery cells
40 Stacks
42 Stacks
44 Drive portion
46 Driver's seat
47 Wheel arms
48 Wheel bearing
50 Rail
52 Control element
54 Side walls
56 Weight
58 Weight
60 Bracket
62 Weight strip
64 Position profile
66 Sliding block
68 Sliding block
69 Leg
70 Leg

The invention claimed is:

1. A battery for an industrial truck comprising:
 a battery body comprising,
  a first base body,
  a second base body positioned adjacent to the first base body, wherein the first base body and the second base body extend a same length in one dimension, and wherein the first base body has a greater height dimension than the second base body,
  a first weight positioned in the first base body, and
  a second weight comprising a first portion and a second portion that form an L-shape, wherein the second portion is shorter than the first portion and is positioned in the first base body,
 wherein the first weight and the second weight position a center gravity of the battery body along a central axis of the battery body, wherein the central axis extends along a longitudinal axis of the battery body.

2. The battery according to claim 1, wherein the first base body and the second base body comprise a cuboid shape, wherein the first base body has a first base body depth and a first base body width, and wherein the second base body has a second base body depth and a second base body width.

3. The battery according to claim 1, Wherein the first base body and the second base body comprise at least one edge.

4. The battery according to claim 2, wherein the first base body depth and the second base body depth are equal to a depth of the battery body.

5. The battery according to claim 2, wherein a width of the battery body is equal to a sum of the first base body width and the second base body width.

6. The battery according to claim 1, further comprising at least one battery terminal positioned on a side of at least one of the first base body and second base body, wherein the side is opposite a contact area.

7. The battery according to claim 1, wherein the battery body further comprising a plurality of battery cells.

8. The battery according to claim 7, wherein the plurality of battery cells are one of lithium-ion cells and lithium polymer cells.

9. The battery according to claim 8, further comprising a battery management system positioned in the first base body.

10. The battery according to claim 9, wherein the battery body comprises at least three packets of battery cells, and wherein at least two packets of battery cells are arranged above one another and at least two packets of battery cells are arranged next to one another.

11. The battery according to claim 10, wherein the battery management system is arranged above a packet of battery cells.

12. The battery according to claim 1, wherein the battery body comprises at least one laterally protruding fastening tab.

13. The industrial truck according to claim 1, wherein the second base body includes a plurality of battery cells that partially extend into the first base body.

14. An industrial truck having a drive portion and comprising:
 a driver cab comprising a driver seat; and
 a battery body comprising,
  a first base body,
  a second base body positioned adjacent the first base body wherein the first base body and the second base body extend a same length in one dimension, and wherein the first base body has a greater height dimension than the second base body, and
  a first weight positioned in the first base body,
  a second weight comprising a first portion and a second portion that form an L-shape, wherein the second portion is shorter than the first portion and is positioned in the first base body,
 wherein the first base body and the second base body extend a same length dimension, and wherein the first base body has a greater height dimension than the second base body,
 wherein the driver seat is positioned on the first base body, wherein a center of gravity of the battery body is positioned along a central axis of the battery body, and
 wherein the central axis extends along the same length dimension and is parallel to a longitudinal axis of the industrial truck.

15. The industrial truck according to claim 14, wherein the second base body defines a legroom space for a driver sitting on the driver seat.

16. The industrial truck according to claim 14, wherein the battery body has a width equal to a width of the driver cab.

17. The industrial truck according to claim 14, further comprising a second weight positioned laterally outside the battery body.

18. The industrial truck according to claim 14, wherein the second base body includes a plurality of battery cells that partially extend into the first base body.

* * * * *